United States Patent
Wang et al.

(10) Patent No.: US 10,382,433 B2
(45) Date of Patent: Aug. 13, 2019

(54) METHOD AND DEVICE FOR INFORMATION INTERACTION AND ASSOCIATION BETWEEN HUMAN BIOLOGICAL FEATURE DATA AND ACCOUNT

(71) Applicant: Alibaba Group Holding Limited, Grand Cayman (KY)

(72) Inventors: Lei Wang, Hangzhou (CN); Chao Feng Meng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 195 days.

(21) Appl. No.: 15/465,518

(22) Filed: Mar. 21, 2017

(65) Prior Publication Data

US 2017/0195323 A1 Jul. 6, 2017

Related U.S. Application Data

(63) Continuation of application No. PCT/CN2015/089952, filed on Sep. 18, 2015.

(30) Foreign Application Priority Data

Sep. 26, 2014 (CN) .......................... 2014 1 0505646

(51) Int. Cl.
*H04L 29/06* (2006.01)
*G06F 16/9535* (2019.01)
(Continued)

(52) U.S. Cl.
CPC ...... *H04L 63/0861* (2013.01); *G06F 16/9535* (2019.01); *G06F 16/9554* (2019.01);
(Continued)

(58) Field of Classification Search
CPC ......... G06F 17/30867; G06F 17/30879; G06F 21/32; G06K 19/06028; H04L 9/3231;
(Continued)

(56) References Cited

U.S. PATENT DOCUMENTS 9,576,135 B1 * 2/2017 Komandoor Elayavilli ................
G06F 21/60
2004/0210448 A1 10/2004 Breck et al.
(Continued)

FOREIGN PATENT DOCUMENTS

CN 1340364 A1 9/2003
CN 101311953 A 11/2008
(Continued)

OTHER PUBLICATIONS

Translation of Chinese Office Action from corresponding Chinese Patent Application No. 2014105056465, dated Jan. 17, 2018, 7 pages.
(Continued)

*Primary Examiner* — Kevin Bechtel
(74) *Attorney, Agent, or Firm* — Lee & Hayes, P.C.

(57) ABSTRACT

A method and an apparatus for information interaction, and a method and an apparatus for associating human biometric data with an account are disclosed. The information interaction method includes: acquiring, when an information interaction operation with a user account of an information interaction party is triggered, human biometric data of a user acting as the information interaction party; suspending the information interaction operation when determining that no matching user account exists according to the human biometric data, and uploading the human biometric data to a server by a device to establish an association relationship between the user account of the user and the human biometric data; and resuming the information interaction opera-
(Continued)

tion when a user account matching the human biometric data sent by the server is received, and completing the information interaction operation with the user account matching the human biometric data.

20 Claims, 11 Drawing Sheets

(51) Int. Cl.
    *G06F 16/955*     (2019.01)
    *G06K 19/06*     (2006.01)
    *H04L 29/08*     (2006.01)
    *G06F 21/32*     (2013.01)

(52) U.S. Cl.
    CPC ....... *G06F 21/32* (2013.01); *G06K 19/06028* (2013.01); *H04L 29/06* (2013.01); *H04L 67/06* (2013.01); *H04L 67/306* (2013.01)

(58) Field of Classification Search
    CPC .............. H04L 29/06; H04L 29/06544; H04L 29/06809; H04L 29/06823–0685; H04L 63/0861; H04L 63/102; H04L 67/06; H04L 67/306
    See application file for complete search history.

(56) References Cited

U.S. PATENT DOCUMENTS

| | | | |
|---|---|---|---|
| 2013/0205377 A1 | 8/2013 | Cheng | |
| 2014/0317699 A1* | 10/2014 | Truong | H04L 63/08 726/5 |
| 2018/0139203 A1* | 5/2018 | Dolan | H04L 63/0861 |

FOREIGN PATENT DOCUMENTS

| | | |
|---|---|---|
| CN | 102523213 | 6/2012 |
| CN | 202772921 | 3/2013 |
| CN | 103118355 A | 5/2013 |
| CN | 103136663 A | 6/2013 |
| CN | 103152330 | 6/2013 |
| CN | 103942880 A | 7/2014 |
| JP | 2008152372 | 7/2008 |
| JP | 2009230493 | 10/2009 |
| JP | 2010108116 | 5/2010 |
| JP | 2010146452 | 7/2010 |
| JP | 2011227882 | 11/2011 |
| JP | 2014011682 | 1/2014 |
| WO | WO2014044135 | 3/2014 |

OTHER PUBLICATIONS

Translation of Chinese Office Action from corresponding Chinese Patent Application No. 2014105056465, dated Aug. 14, 2018, 11 pages.
Translation of Chinese Search Report from corresponding Chinese Patent Application No. 2014105056465, dated Jan. 3, 2018, 2 pages.
Zhang, "Research and Development on intelligent system based on human biometric identification," Electronic Technology & Information Science, China Master's Theses Full-Text Database, Issue 01, Jan. 15, 2006, 59 pages (see pp. 4-5).
Translation of International Search Report from corresponding PCT application No. PCT/CN2015/089952 dated Nov. 25, 2015, 2 pages.
Translation of Written Opinion from corresponding PCT application No. PCT/CN2015/089952 dated Nov. 25, 2015, 6 pages.
The Extended European Search Report dated May 9, 2018, for European Application No. 15844630.2, 7 pages.
Translated the Japanese Office Action dated Feb. 19, 2019 for Japanese Patent Application No. 2017-516494, a counterpart foreign application of U.S. Appl. No. 15/465,518, 13 pages.

* cited by examiner

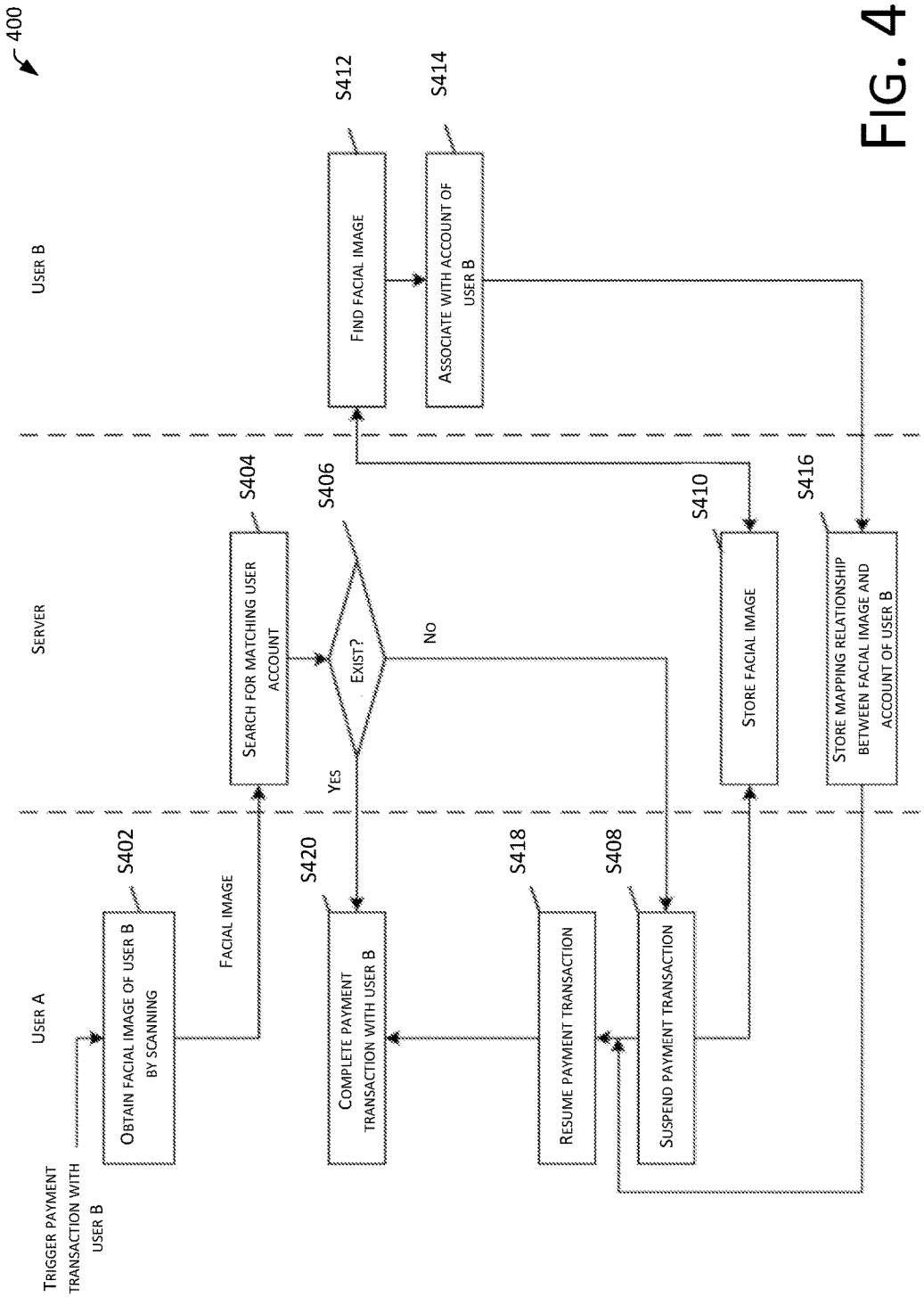

METHOD AND DEVICE FOR INFORMATION INTERACTION AND ASSOCIATION BETWEEN HUMAN BIOLOGICAL FEATURE DATA AND ACCOUNT

CROSS REFERENCE TO RELATED PATENT APPLICATIONS

This application claims priority to and is a continuation of PCT Patent Application No. PCT/CN2015/089952, filed on 18 Sep. 2015, and is related to Chinese Patent Application No. 201410505646.5 filed on 26 Sep. 2014, entitled "Method and Device for Information Interaction and Association between Human Biological Feature Data and Account," which are hereby incorporated by reference in their entirety.

TECHNICAL FIELD

The present disclosure relates to the field of information interaction technologies, and in particular, to information interaction methods and apparatuses, and methods and apparatuses for associating human biological data with an account.

BACKGROUND

Human biological data includes a facial feature, a fingerprint feature, a palmprint feature, a retinal feature, a skeletal feature, a heartbeat feature, etc., possessing characteristics that are strongly personalized and difficult to be imitated. Therefore, based on human biological data, operations, such as fast and secure account login and information interaction, can be implemented by directly scanning human biological data of a user, without the need of the user to record information such as an account, a password, etc.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method and an apparatus for information interaction, and a method and an apparatus for associating human biometric data with an account, which can reduce the number of times of acquiring the human biometric data, and enhance the efficiency of information interaction.

In order to achieve the foregoing objectives, the present disclosure provides the following technical solutions.

In implementations, an information interaction method is provided. In implementations, the method may include acquiring human biometric data of a user acting as an information interaction party when an information interaction operation with a user account of the information interaction party is triggered; suspending the information interaction operation upon determining that no matching user account is found based on the human biometric data, and uploading the human biometric data to a server via a device to establish an association relationship between a user account of the user and the human biometric data; and resuming the information interaction operation when a user account matching the human biometric data is received from the server, and completing the information interaction operation with the user account matching the human biometric data.

In implementations, an information interaction method is provided. In implementations, the method may include sending a data query request to a server using a logged-in account to query human biometric data of a user corresponding to the logged-in account, which is acquired and uploaded by a device to which a user account of an information interaction party belongs; sending an association request to the server to establish an association relationship between the logged-in account and human biometric data that is found; and completing an information interaction operation with the user account of the information interaction party when interaction information sent by the account of the information interaction party according to the association relationship is received.

In implementations, a method for associating human biometric data with an account is provided. In implementations, the method may include receiving human biometric data that is uploaded by a device; associatively storing the human biometric data and corresponding identification information; receiving request information from a user account, the request information including the identification information; and searching for the human biometric data corresponding to the identification information included in the request information, and establishing an association relationship between the user account and the human biometric data that is found.

In implementations, an information interaction apparatus is provided. In implementations, the apparatus may include an acquisition unit configured to acquire human biometric data of a user acting as an information interaction party when an information interaction operation with a user account of the information interaction party is triggered; a processing unit configured to suspend the information interaction operation upon determining that no matching user account is found based on the human biometric data, and upload the human biometric data to a server via a device to establish an association relationship between a user account of the user and the human biometric data; an interaction unit configured to resume the information interaction operation when a user account matching the human biometric data is received from the server, and complete the information interaction operation with the user account matching the human biometric data.

In implementations, an information interaction apparatus is provided. In implementations, the apparatus may include a query unit configured to send a data query request to a server using a logged-in account to query human biometric data of a user corresponding to the logged-in account, which is acquired and uploaded by a device to which a user account of an information interaction party belongs; an association unit configured to send an association request to the server to establish an association relationship between the logged-in account and the human biometric data that is found; and an interaction unit configured to complete an information interaction operation with the user account of the information interaction party when interaction information sent by the account of the information interaction party according to the association relationship is received.

In implementations, an apparatus for associating human biometric data with an account is provided. In implementations, the apparatus may include a data receiving unit configured to receive human biometric data that is uploaded by a device; an association storage unit configured to associatively store the human biometric data and corresponding identification information; a request receiving unit configured to receive request information from a user account, the request information including the identification information; and an association processing unit configured to search for human biometric data corresponding to the identification information included in the request information, and establish an association relationship between the user account and the human biometric data that is found.

As can be seen from the above technical solutions, the present disclosure waits for a user of an information interaction party to establish an association relationship between human biometric data and a user account in real time, by suspending and resuming an information interaction operation, thus reducing the number of times of acquiring the human biometric data, avoiding the number of times of performing information interaction operations, and thus facilitating an improvement in the efficiency of information interaction.

BRIEF DESCRIPTION OF THE DRAWINGS

FIG. 4 is a flowchart of performing a payment service according to an exemplary embodiment of the present disclosure.

DETAILED DESCRIPTION

When an information interaction between users is implemented, operations of sending and receiving interaction information between individual user accounts corresponding to the users needed to be performed based on the user accounts. In a process of information interaction based on human biometric data, an association is actually established between human biometric data of a user and a user account, so that a process of operations of information interaction can be implemented more easily and securely by making use of characteristics of the human biometric data, such as being easy to acquire and difficult to imitate, and being highly secure.

Figure 1:
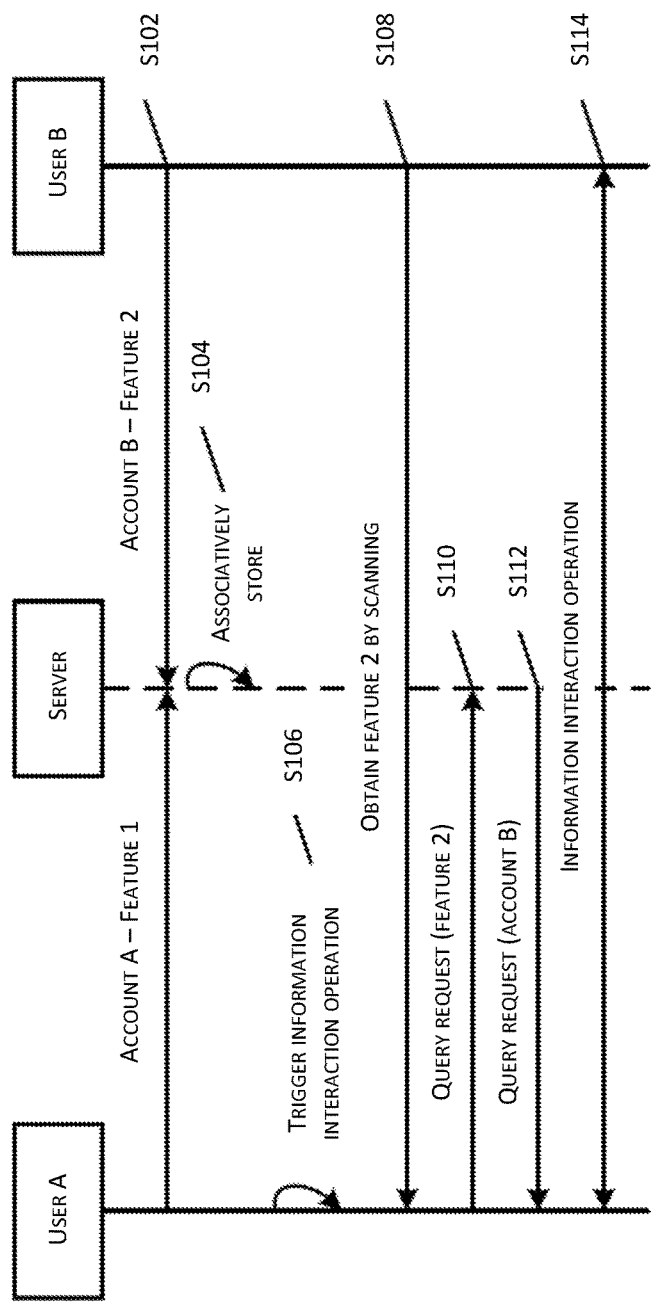
FIG. 1 is a flowchart of an information interaction method.

As shown in FIG. 1, if information interaction is implemented between a user A and a user B, a common processing procedure 100 is given as follows:

At S102, the user A and the user B separately store association relationships between user accounts thereof and human biometric data thereof in a server. A user account corresponding to the user A is assumed to be an account A, and human biometric data corresponding to the user A is assumed to be a feature 1. A user account corresponding to the user B is assumed to be an account B, and human biometric data corresponding to the user B is assumed to be a feature 2. In this case, association relationships: the account A—the feature 1, and the account B—the feature 2 are individually stored in the server for the user A and the user B.

At S104, the server associatively stores user accounts and human biometric data that are received, for example, the account A and the feature 1, the account B and the feature 2, etc., as shown in FIG. 1.

At S106, an information interaction operation is assumed to be triggered by the user A.

At S108, the user A scans the user B using a scanning device to obtain the human biometric data of the user B, for example, the feature 2.

At S110, the user A sends a query request to the server via a terminal, the query request including the scanned feature 2.

At S112, the server finds that a user account matching the feature 2 is the account B, based on a pre-stored association relationship: the account B—the feature 2, and returns a query result including the account B to the user A.

Apparently, if the user B triggers an information interaction operation at S106, the user B scans the user A using a scanning device to obtain the feature 1 at S108. The user B sends a query request including the feature 1 to the server at S110. The server may find the account A corresponding to the feature 1 uploaded by the user B according to an association relationship: the account A—the feature 1 at S112.

At S114, the user A performs information interaction with the account B (corresponding to the user B) via the account A, thus implementing the information interaction between the user A and the user B.

Through the above processing procedure as shown in FIG. 1, an information interaction between the user A and the user B may be easily implemented, and another user who logs into the account B is prevented from imitating as the user B through scanning the feature of the user B.

Nevertheless, an implementation of the above processing procedure relies on S102. Specifically, both parties of information interaction need to store association relationships between respective user accounts and respective human biometric data in a server in advance, so that a user account corresponding to human biometric data obtained by scanning can be found based on the pre-stored association relationships (i.e., S112) during a process of operations of information interaction.

Figure 2:
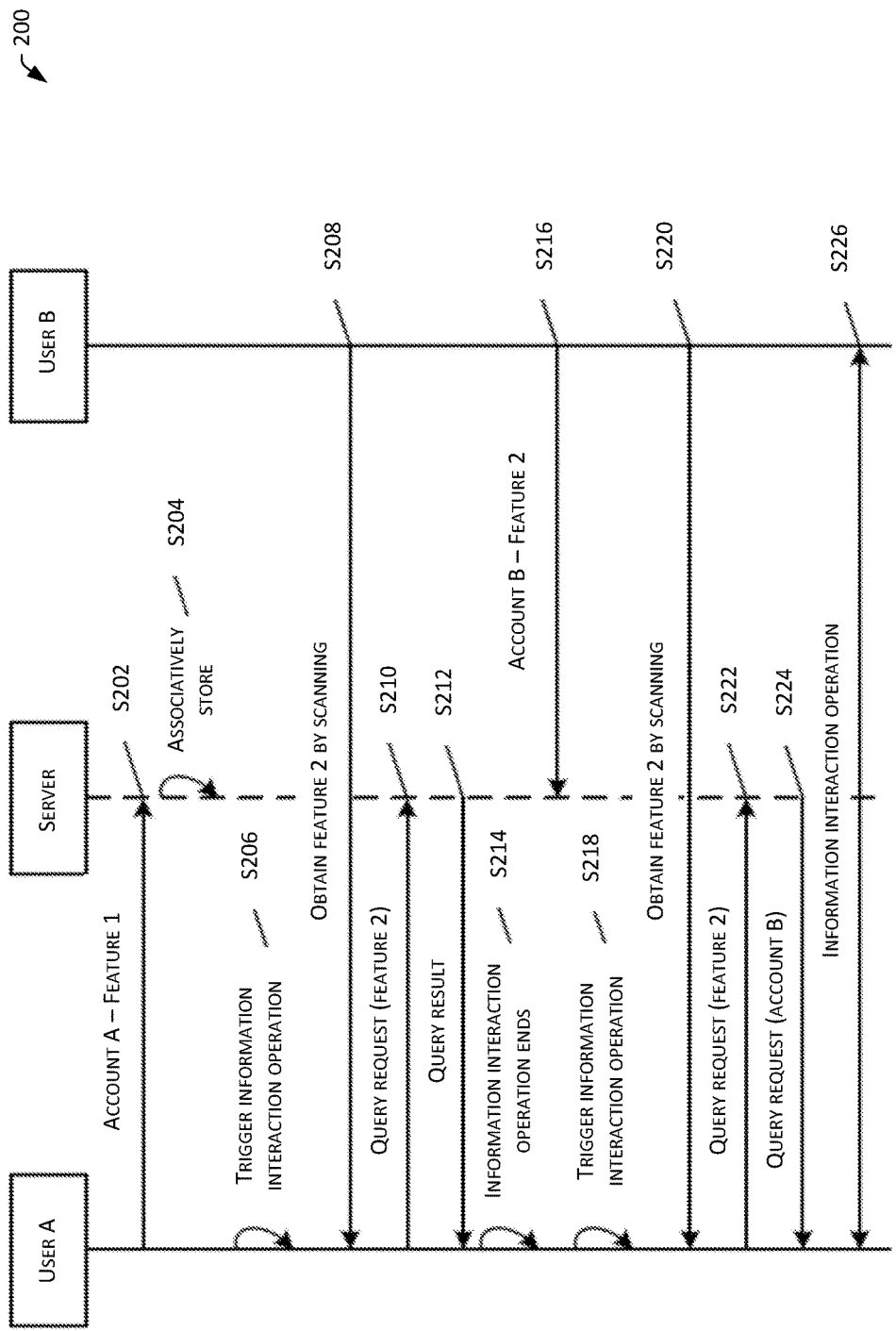
FIG. 2 is a flowchart of another information interaction method.

However, especially when an application function is just launched, the server may not have stored user accounts and human biometric data of a number of users associatively, thus leading to processing 200 as shown in FIG. 2:

At S202, only the user A uploads the account A and the feature 1 thereof to the server.

At S204, the server stores the account A and the feature 1 in association.

At S206, the user A triggers a first information interaction operation.

At S208, the user A scans the user B via a scanning device, and obtains human biometric data of the user B, for example, the feature 2.

At S210, the user A sends a query request to the server via a terminal, the query request including the scanned feature 2.

At S212, the server cannot find a user account matching the feature 2, and returns a query result of "Not found" to the user A because the user B does not upload and store the account B and the feature 2 associatively to the server.

At S214, a first information interaction operation triggered by the user A ends because an information interaction party cannot be determined.

At S216, the user B needs to scan himself/herself using the scanning device, and stores human biometric data that is obtained, e.g., the feature 2, and the account B associatively in the server.

At S218, the user A triggers a second information interaction operation.

At S220, the user A scans the user B via the scanning device, and obtains the human biometric data of the user B, for example, the feature 2.

At S222, the user A sends a query request to the server via the terminal, the query request including the scanned feature 2.

At S224, the server finds that the user account matching the feature 2 is the account B based on the pre-stored association relationship: the account B—the feature 2, and returns a query result including the account B to the user A.

At S226, the user A performs an information interaction with the account B (corresponding to the user B) via the account A, thus implementing the information interaction between the user A and the user B.

As can be seen, when an information interaction party does not store a user account and human biometric data associatively in advance, information interaction operations need to be triggered at least twice (S206 and S218) and human biometric data needs t be scanned for three times (S208, S216 and S220). A process of operations thereof is very complex and cumbersome.

However, in the technical solutions of the present disclosure, the number of times of acquiring human biometric data can be reduced, user operations are simplified, and the efficiency of information interaction is enhanced.

To further describe the present disclosure, an embodiment is provided as follows.

Figure 3A:
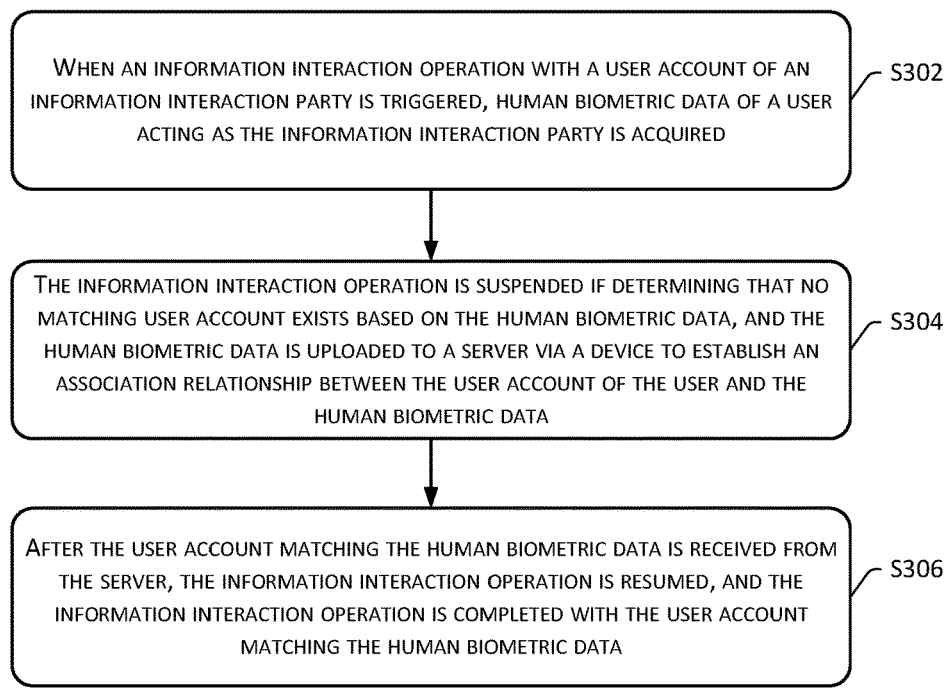
FIG. 3A is a flowchart of an information interaction method from the perspective of a terminal according to an exemplary embodiment of the present disclosure.

Referring to FIG. 3A, FIG. 3A shows a flowchart of an information interaction method 300 according to an exemplary embodiment of the present disclosure. The method 300 is applied to a terminal, and may include the following procedure.

At S302, when an information interaction operation with a user account of an information interaction party is triggered, human biometric data of a user acting as the information interaction party is acquired.

In implementations, the human biometric data may include at least one of the followings: a facial feature, a fingerprint feature, a palmprint feature, a retinal feature, a skeletal feature, a heartbeat feature, etc. Apparently, one skilled in the art should understand that the present disclosure does not limit a specific type of "human biometric data", and, other biological features that can be used for user identification can obviously also be applicable to the technical solution of the present disclosure.

Specifically, in implementations, an information interaction operation may be directly triggered via an APP (Application) installed in a terminal. Alternatively, the information interaction operation may be indirectly triggered by calling a function between APPs.

At S304, the information interaction operation is suspended if determining that no matching user account exists based on the human biometric data, and the human biometric data is uploaded to a server via a device to establish an association relationship between the user account of the user and the human biometric data.

In implementations, the acquired human biometric data may be uploaded to the server according to the user account by logging into the user account on the device.

In implementations, user accounts and respective human biometric data may be stored in a mapping relationship database associatively, and a user account matching the acquired human biometric data may be determined by querying the mapping relationship database.

As an exemplary implementation, the user may download and store a mapping relationship database in a local terminal to form a corresponding local mapping relationship database, and search for a user account matching the acquired human biometric data in the local mapping relationship database. At the same time, data update may further be performed regularly with the server to ensure data in the local mapping relationship database is up to date.

In implementations, for a mapping relationship stored in the local mapping relationship database, a corresponding user account may be a user account of a friend (such as a contact in an address book), or may be a user account having an account relationship based on a previously performed information interaction operation, to avoid an excessive occupancy of a local storage space or a reduction in query efficiency due to an excessively large volume of data stored in the local mapping relationship database.

As another exemplary implementation, an online mapping relationship database may be created in the server, and the user may send the acquired human biometric data to the server so that the server searches for a user account matching the human biometric data in the online mapping relationship database. Using the online mapping relationship database, mapping relationships therein may be updated online, and data is ensured to be up to date.

In implementations, by storing the acquired human biometric data in the server, the user acting as the information interaction party may directly use the human biometric data. In other words, the association relationship is established between his/her own account and the human biometric data, and the user does not need to scan and acquire his/her own human biometric data again, thus effectively reducing the number of times of acquiring the human biometric data and enhancing the efficiency of information interaction.

At S306, after the user account matching the human biometric data is received from the server, the information interaction operation is resumed, and the information interaction operation is completed with the user account matching the human biometric data.

In implementations, by resuming the information interaction operation, the user needs to neither perform the information interaction operation again nor reacquire the human biometric data of the user acting as the information interaction party, thus facilitating an enhancement of the efficiency of information interaction.

In implementations, as an exemplary implementation, after the user acting as the information interaction party establishes the user account corresponding to the human biometric data (which is uploaded to the server at S304), the server may directly push the user account to the terminal. As another exemplary implementation, the terminal may initiate a polling operation to the server after S304, and then the server may return the matching user account as a query result to the terminal according to the polling operation.

Figure 3B:
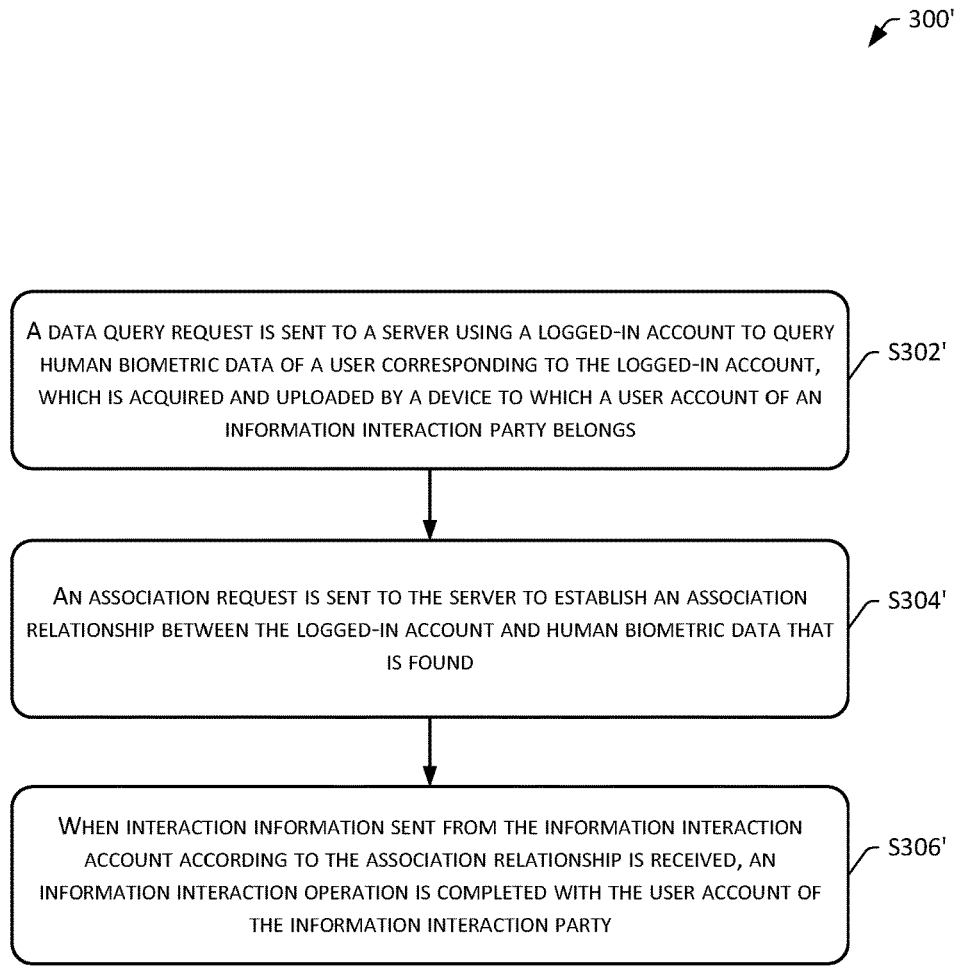
FIG. 3B is a flowchart of an information interaction method from the perspective of a terminal according to another exemplary embodiment of the present disclosure.

In the embodiment as shown in FIG. 3A, the description is made from the perspective of the user A as shown in FIG. 1 and FIG. 2, i.e., the embodiment is applied in the terminal of the user A. Correspondingly, referring to FIG. 3B, FIG. 3B shows a flowchart of an information interaction method according to another exemplary embodiment of the present disclosure. The method may be applied in a terminal of the user B as shown in FIG. 1 and FIG. 2, and may include the following procedure 300'.

At S302', a data query request is sent to a server using a logged-in account to query human biometric data of a user corresponding to the logged-in account, which is acquired and uploaded by a device to which a user account of an information interaction party belongs.

In implementations, the user does not need to reacquire his/her own human biometric data, but directly uses the human biometric data acquired and uploaded to the server according to the embodiment as shown in FIG. 3A, thus reducing the number of times of acquiring the human biometric data.

At S304', an association request is sent to the server to establish an association relationship between the logged-in account and human biometric data that is found.

At S306', when interaction information sent from the information interaction account according to the association relationship is received, an information interaction operation is completed with the user account of the information interaction party.

As can be seen from the foregoing embodiment, when no user account that matches acquired human biometric data is found, a user interaction operation is not ended directly, but is suspended and resumed in the present disclosure, thus avoiding triggering the information interaction operation multiple times. Furthermore, by uploading the acquired human biometric data to a server, the user acting as an information interaction party does not need to reacquire his/her own human biometric data, and may directly configure a corresponding user account for the uploaded human biometric data, thus facilitating a reduction in the number of times of acquiring the human biometric data and enhancing the efficiency of information interaction.

According to the technical solutions, the present disclosure may be applied to various types of information interaction scenarios. For example, a specific application scenario of a "payment service" is taken as an example to describe an implementation process of the solutions in detail hereinafter. Referring to FIG. 4, FIG. 4 shows a flowchart of performing a payment service according to an exemplary embodiment of the present disclosure. The method relates to a process that the user A makes a payment to the user B, which may include the following procedure 400.

At S402, after the user A triggers a payment service with the user B, a facial image of the user B is obtained by scanning.

In implementations, the payment service may be directly triggered by the user A. For example, the payment service may be triggered via an "Alipay™" client in a terminal such as a cell phone or a tablet computer. Alternatively, the payment service may be triggered by the user through a "Purchase" operation, for example.

In implementations, the user A may directly acquire human biometric data of the user B via a functional component configured in a terminal, or may connect to an external functional component through a wired or wireless manner and receive data sent by the external functional component after the external functional component scans and acquires the human biometric data of the user B. If the human biometric data used herein is a facial image, the user A may scan and acquire the facial image of the user B via an internal or external camera of the terminal.

In implementations, the human biometric data may also be acquired in advance. For example, the user A stores the facial image of the user B in the terminal in advance, so that an interaction may be performed using previously acquired information even if the user B is not present.

At S404, the user A sends the facial image of the user B to the server, and the server searches for a user account matching the facial image.

In implementations, as an exemplary implementation, an online database may be configured in the server, and mapping relationships between facial images and user accounts that are uploaded by users in advance are stored in the online database. Based on the facial image uploaded by the user A, a search can be made as to whether a user account matching thereto exists.

Apparently, as another exemplary implementation, the user A may also download the mapping relationship to a terminal thereof to establish a corresponding local database, and search for a user account matching the facial image locally.

At S406, if a matching user account exists, S420 is performed. Otherwise, S408 is performed.

At S408, the user A suspends the payment transaction with the user B.

At S410, the user A uploads and stores the acquired facial image of the user B to the server.

In implementations, "S408" and "S410" are only used to distinguish two steps of operation, but are not used to limit a specific order of execution thereof.

As an exemplary implementation, the user B may apparently determine his/her own facial image by viewing and examining facial images on the server one by one.

As another exemplary implementation, as facial images (or other human biometric data) of many users may exist in the server, the user A may associatively upload the acquired facial image and corresponding identification information to the server at S410, and the user B may thus quickly acquire the facial image corresponding thereto from the server based on the identification information.

When the user A generates and then uploads identification information to the server, the identification information may include at least one of the following: account attribute information of a local logged-in account, time information of human biometric data that is uploaded by a terminal device used by the user A, geographical location information of the human biometric data uploaded by the terminal device, attribute information of the terminal device, attribute information of a network environment where the terminal device is located, a self-defined string, and a random string generated by the terminal device. The account attribute information may include: an account name of the user A, a mobile phone number of the user A, etc. The attribute information of the terminal device may include: an ID assigned to the terminal device by the server, an ID of a component in the terminal device, etc. The attribute information of a network environment where the terminal device is located may include: an IP address of the terminal device, a MAC address, etc. Apparently, if the user A is present with the user B, the user A may manually input random identification information or control the terminal device to generate random identification information, such as a string of random code, so that the user B may find a corresponding facial image according to the random code.

As another exemplary implementation, after receiving the human biometric data uploaded by the user A, the server may generate corresponding identification information therein, and stores the human biometric data and the identification information in association. The server then returns the identification information to a terminal device of the user A. As such, the user B may acquire the identification information from the terminal device, which may be used in subsequent operations of searching and account association of the human biometric data.

When the identification information is generated by the server, the identification information may be a random string. Since the identification information is generated by the server, the uniqueness of each piece of identification information in the server can be ensured.

In implementations, the identification information may be sent to the user B by the user A, and may also be acquired by the user B on his/her own. When the user B acquires the identification information on his/her own, the user A may display the identification information on a screen interface of the terminal, and the user B may: 1) read the identification information, and input thereof into the terminal and upload it to the server, to search for a matching facial image; 2) use a camera on the terminal to automatically recognize the identification information through an OCR technology; 3) the user B may read and analyze the identification information in a bar code through a corresponding recognition function if the user A generates the bar code corresponding to the identification information, such as a one-dimensional code or a two-dimensional code.

At S412, the user B finds his/her facial image in the server.

At S414, the user B associates the found facial image with his/her own user account B.

At S416, the user B stores a mapping relationship between the found facial image and his/her own user account B in the server. The server may update the mapping relationship to the online database.

At S418, based on the stored mapping relationship, the server may send the user account B corresponding to the facial image acquired at S402 to the terminal of the user A to resume the payment transaction.

At S420, the payment transaction with the user B is completed.

In the above embodiment, a user may complete an information interaction operation by acquiring human biometric data only once, and the information interaction operation does not need to be started for multiple times, thus being conducive to simplifying a process of operations and enhancing the efficiency of information interaction.

Figure 5:
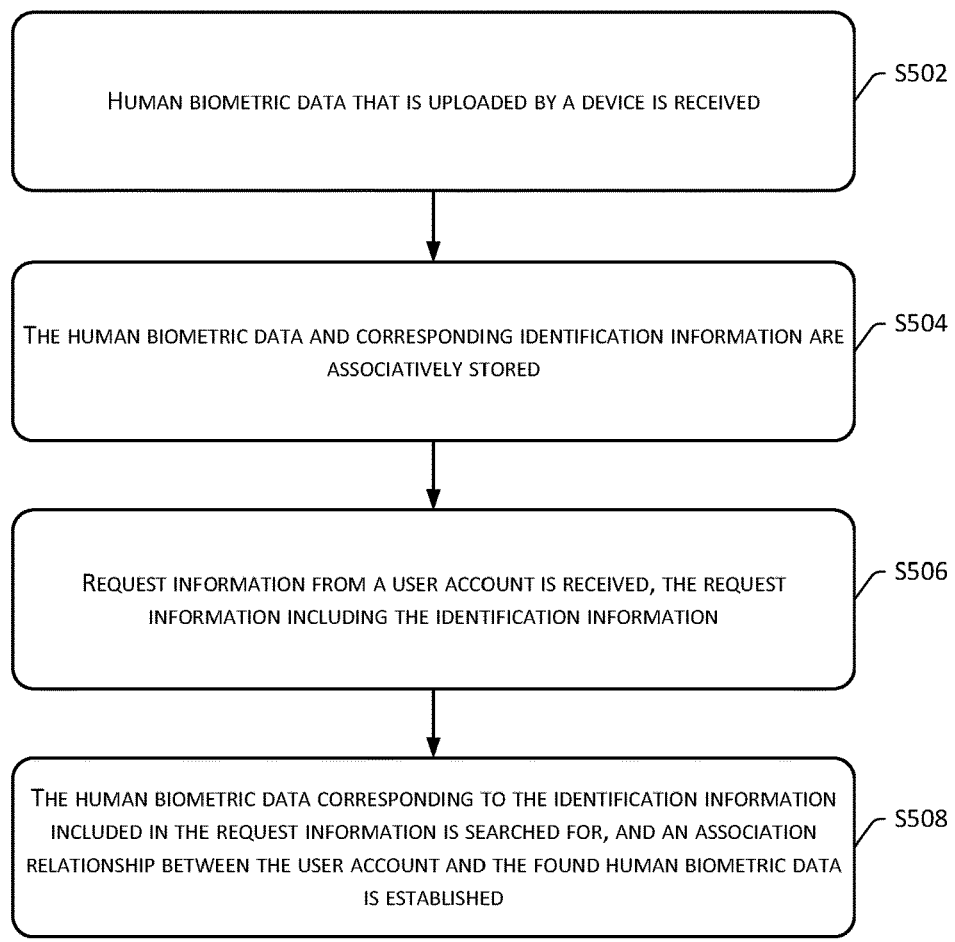
FIG. 5 is a flowchart of a method of associating human biometric data with an account from the perspective of a server according to an exemplary embodiment of the present disclosure.

Referring to FIG. 5, FIG. 5 shows a flowchart of a method 500 of associating human biometric data with an account from the perspective of a server according to an exemplary embodiment of the present disclosure. The method 500 is applied to a server, and may include the following procedure.

At S502, human biometric data that is uploaded by a device is received.

At S504, the human biometric data and corresponding identification information are associatively stored.

In implementations, as a number of pieces of human biometric data uploaded by a great number of user accounts may exist in the server, associatively storing the pieces of human biometric data and respective pieces of identification information facilitates discrimination of different pieces of human biometric data effectively and avoids confusion.

As an exemplary implementation, identification information may be uploaded by a user using a device, and the identification information at this point may include at least one of the following: account attribute information of a logged-in account in the device, time information of human biometric data uploaded by the device, geographical location information of the human biometric data uploaded by the device, attribute information of the device, attribute information of a network environment where the device is located, a self-defined string, and a random string generated by the device.

As another exemplary implementation, the identification information may be generated locally by the server, and the identification information at this point may be a random string. When the server generates identification information, the uniqueness of each piece of identification information can be ensured, which avoids a reduction in the efficiency of acquiring correct human biometric data due to too many query results being returned when the user uses the identification information to conduct a search.

At S506, request information from a user account is received, the request information including the identification information.

In implementations, the user account sending the request information may be an account that is the same as or different from the user account that sends the human biometric data at S502.

At S508, the human biometric data corresponding to the identification information included in the request information is searched for, and an association relationship between the user account and the found human biometric data is established.

As can be seen from the above embodiment, by uploading human biometric data of a user to a server in the present disclosure, the user may directly establish an association relationship between the human biometric data and a user account, thus preventing the user from acquiring the human biometric data for multiple times, and facilitating an enhancement in the efficiency of account association.

In addition, a server-based information interaction operation may further be implemented based on the method of associating human biometric data with an account as shown in FIG. 5, for improving the efficiency of information interaction between users. For example, when the user A hopes to send a photo to the user account b corresponding to the user B, and the user B has not established an association between his/her own facial image and the user account b in advance, the photo from the user A may be sent to the user B indirectly based on information forwarding by the server. Details of a process thereof include the following:

At S502, the user A acquires a facial image (or other human biometric data) of the user B. However, since the user B does not establish an association between his/her own facial image and the user account b in advance, the user A sends N acquired facial image to A server, and also sends a photo (or other information to be communicated) that needs to be sent to the user B to the server.

At S504, the photo, the facial image, and a corresponding piece of identification information that are uploaded by the user A are associatively stored. As multiple pieces of information to be communicated, pieces of human biometric data, etc., may be stored in the server, an associative storing operation facilitates effective discrimination of the stored information and data.

At S506, according to identification information in request information from the user B, the facial image uploaded by the user A may be found so that an association between the user account b and the found facial image is established on one hand. On the other hand, the found photo may be sent to the user B, so that an interaction between the user account a of the user A and the user account b of the user B can be completed.

As can be seen, although an information interaction operation (i.e., an operation of sending a photo) between the user A and the user B is suspended because the user B does not establish an association relationship between his/her own facial image and the user account b in advance, the information interaction operation is resumed and completed successfully based on an association establishing operation performed by the user B afterwards, and through a "relay" of the photo by the server.

Figure 6:
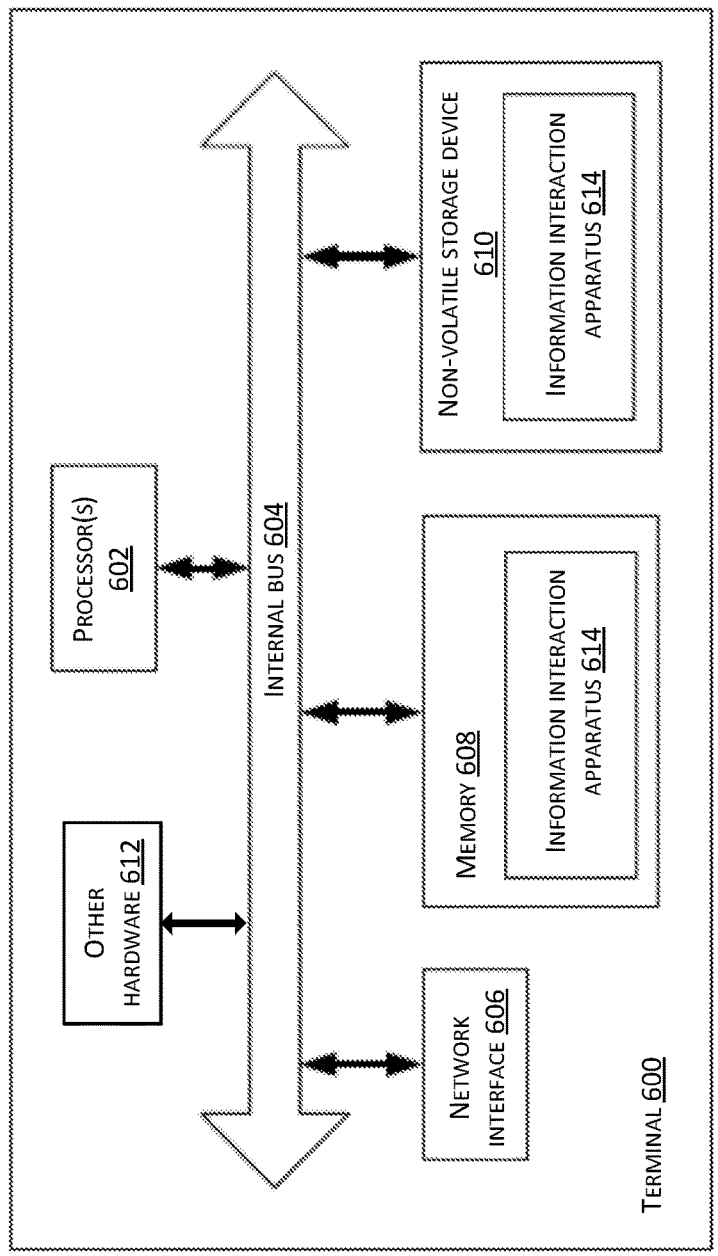
FIG. 6 is a schematic structural diagram of a terminal according to an exemplary embodiment of the present disclosure.

In a typical configuration, a computing device includes one or more processors (CPU), an input/output interface, a network interface, and memory. FIG. 6 is a schematic structural diagram of a terminal 600 according to an exemplary embodiment of the present disclosure. Referring to FIG. 6, on a hardware level, the electronic device includes processor(s) 602, an internal bus 604, a network interface 606, memory 608, and a non-volatile storage device 610, and may apparently further include other hardware 612 required by other services. The processor(s) 602 read(s) a corresponding computer program from the non-volatile storage device 610 into the memory 608 and runs the computer program, thereby forming an information interaction apparatus 614 on a logic level. Apparently, besides software implementations, the present disclosure does not exclude other implementations, such as implementations in a form of logic devices or a combination of software and hardware. In other words, executing entities in the following flow of processing may include, but not limited to, various logic units, and may also include hardware or logic devices.

The memory 608 may include a form of computer-readable media, e.g., a non-permanent storage device, random-access memory (RAM) and/or a nonvolatile internal storage, such as read-only memory (ROM) or flash RAM. The memory 608 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

Figure 7:
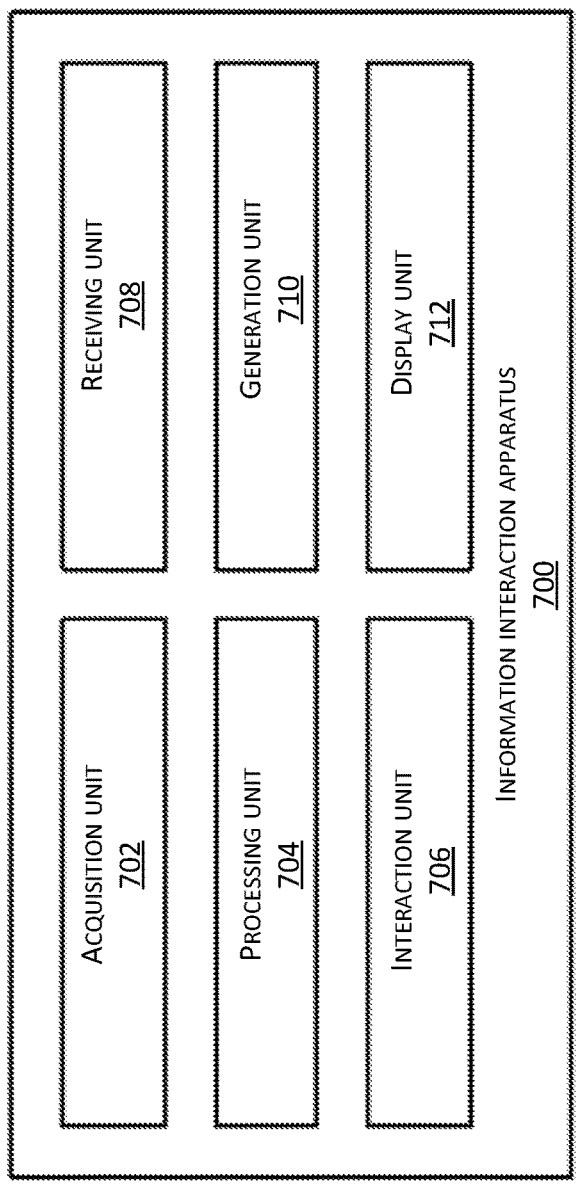
FIG. 7 is a block diagram of an information interaction apparatus according to an exemplary embodiment of the present disclosure.

Referring to FIG. 7, in an implementation corresponding to the information interaction method as shown in FIG. 3A, the information interaction apparatus 700 may include an acquisition unit 702, a processing unit 704, and an interaction unit 706.

The acquisition unit 702 is configured to acquire, when an information interaction operation with a user account of an information interaction party is triggered, human biometric data of a user acting as the information interaction party.

The processing unit 704 is configured to suspend the information interaction operation if determining that no matching user account exists based on the human biometric data, and upload the human biometric data to a server via a device, so that the user establishes an association relationship between a user account thereof and the human biometric data.

The interaction unit 706 is configured to resume the information interaction operation when a user account that matches the human biometric data sent by the server is received, and complete the information interaction operation with the user account that matches the human biometric data.

In implementations, the processing unit 704 may be further configured to:

search for whether the user account matching the human biometric data exists in a local mapping relationship database, wherein the local mapping relationship database stores mapping relationships between pieces of human biometric data and respective user accounts; or send the human biometric data to the server to cause the server to search for whether the user account matching the human biometric data exists in an online mapping relationship database, and receive a query result returned from the server, wherein the online mapping relationship database stores mapping relationships between the pieces of human biometric data and the respective user accounts.

In implementations, the apparatus 700 My further include a receiving unit 708 or a generation unit 710.

The receiving unit 708 is configured to receive, identification information returned by the server after the human biometric data is sent to the server, wherein the human biometric data and the identification information are associatively stored in the server.

The generation unit 710 is configured to generate the identification information, and send the identification information to the server to store the human biometric data and the identification information associatively in the server.

In implementations, when the identification information is returned by the server, the identification information includes a random string.

When the identification information is generated locally, the identification information includes at least one of account attribute information of a logged-in account in the device, time information of the human biometric data uploaded by the device, geographical location information of the human biometric data uploaded by the device, attribute information of the device, attribute information of a network environment where the device is located, a self-defined string, or a random string generated by the device.

In implementations, the apparatus 700 may further include a display unit 712 configured to display the identification information, or display a barcode graphic generated according to the identification information.

In implementations, the information interaction operation includes performing a face-to-face transfer operation with the user account matching the human biometric data.

Figure 8:
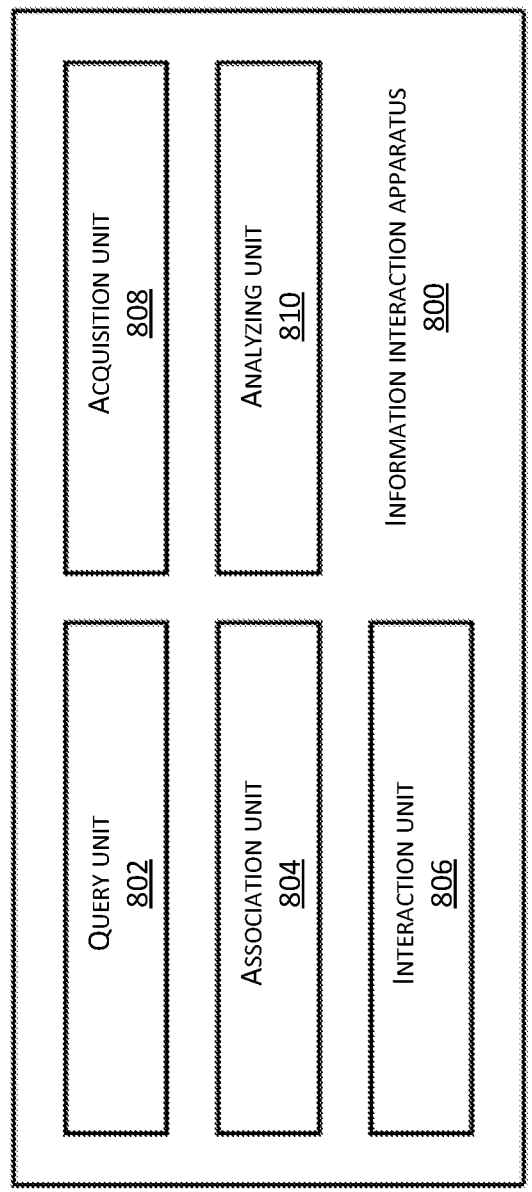
FIG. 8 is a block diagram of an information interaction apparatus according to another exemplary embodiment of the present disclosure.

Referring to FIG. 8, in an implementation corresponding to the information interaction method as shown in FIG. 3B, the information interaction apparatus 800 may include a query unit 802, an association unit 804, and an interaction unit 806.

The query unit 802 is configured to send a data query request to a server using a logged-in account to query human biometric data of a user corresponding to the logged-in account, which is acquired and uploaded by a device to which a user account of an information interaction party belongs.

The association unit 804 is configured to send an association request to the server to establish an association relationship between the logged-in account and human biometric data that is found.

The interaction unit 806 is configured to complete an information interaction operation with the user account of the information interaction party upon receiving interaction information sent by the account of the information interaction party according to the association relationship.

In implementations, the data query request includes identification information, the identification information being generated by the device and sent to the server, or generated by the server and sent to the device, wherein the human biometric data and the identification information are associatively stored in the server.

In implementations, the apparatus 800 may further include an acquisition unit 808 configured to acquire a barcode graphic displayed on a screen interface of the device; and an analyzing unit 810 configured to analyze the barcode graphic to obtain the identification information.

In implementations, the information interaction operation includes performing a face-to-face transfer operation with the user account of the information interaction party.

Figure 9:
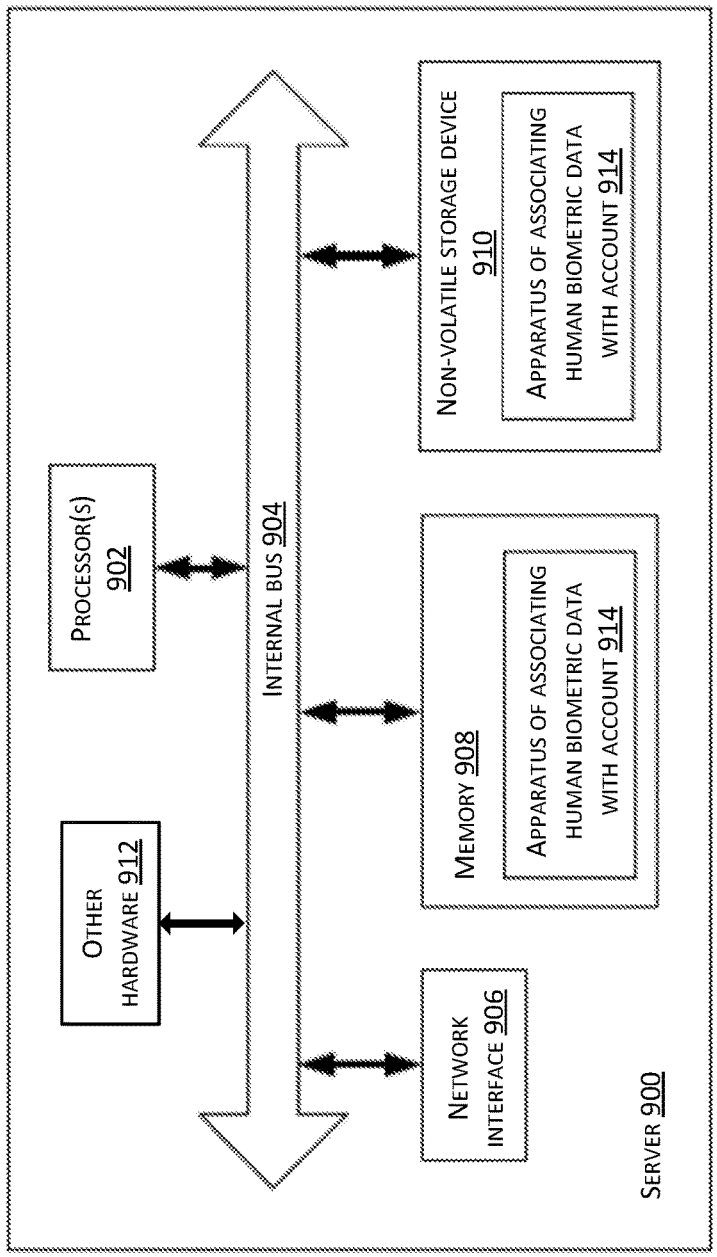
FIG. 9 is a schematic structural diagram of a server according to an exemplary embodiment of the present disclosure.

FIG. 9 is a schematic structural diagram of a server 900 according to an exemplary embodiment of the present disclosure. Referring to FIG. 9, on a hardware level, on a hardware level, the server 900 includes processor(s) 902, an internal bus 904, a network interface 906, memory 908, and a non-volatile storage device 910, and may apparently further include other hardware 912 required by other services. The processor(s) 902 read(s) a corresponding computer program from the non-volatile storage device 910 into the memory 908 and runs the computer program, thereby forming an apparatus 914 of associating human biometric data with an account on a logic level. Apparently, besides software implementations, the present disclosure does not exclude other implementations, such as implementations in a form of logic devices or a combination of software and hardware. In other words, executing entities in the following flow of processing may include, but not limited to, various logic units, and may also include hardware or logic devices. The memory 908 may include a form of computer-readable media as described in the foregoing description.

Figure 10:
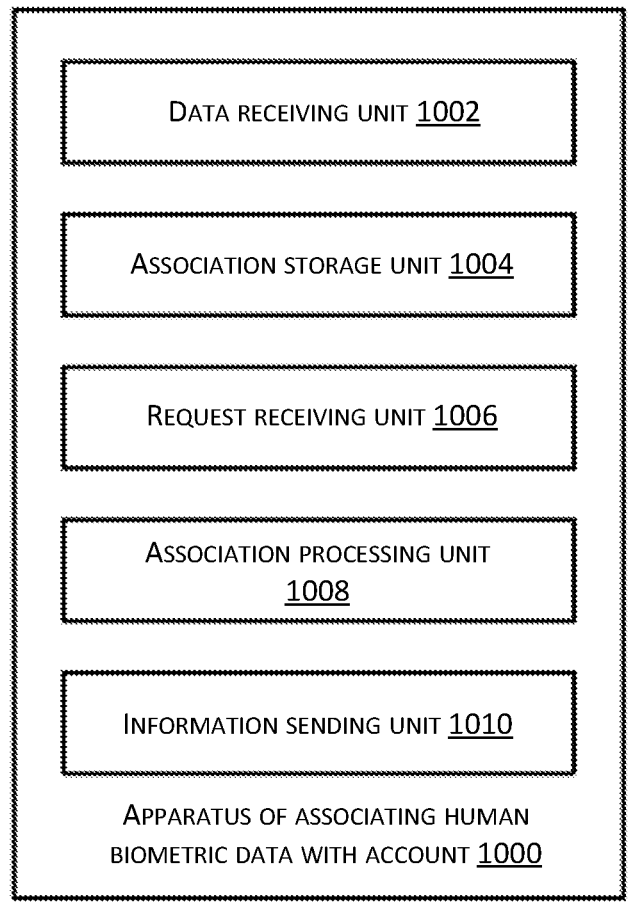
FIG. 10 is a block diagram of an apparatus for associating human biometric data with an account according to another exemplary embodiment of the present disclosure.

Referring to FIG. 10, in implementations, the apparatus 1000 of associating human biometric data with an account may include a data receiving unit 1002, an association storage unit 1004, a request receiving unit 1006, and an association processing unit 1008.

The data receiving unit 1002 is configured to receive human biometric data uploaded by a device.

The association storage unit 1004 is configured to associatively store the human biometric data and corresponding identification information.

The request receiving unit 1006 is configured to receive request information from a user account, the request information including identification information; and The association processing unit 1008 is configured to search for human biometric data corresponding to the identification information included in the request information, and establish an association relationship between the user account and human biometric data that is found.

In implementations, the identification information is uploaded by the device, or generated locally.

In implementations, when the identification information is uploaded by the device, the identification information includes at least one of account attribute information of a logged-in account in the device, time information of the human biometric data uploaded by the device, geographical location information of the human biometric data uploaded by the device, attribute information of the device, attribute information of a network environment where the device is located, a self-defined string, or a random string generated by the device.

When the identification information is generated locally, the identification information includes a random string.

In implementations, the data receiving unit 1002 may further receive information to be interacted that is uploaded by the device.

In implementations, the association storage unit 1004 may further associatively store the information to be interacted, the human biometric data, and the identification information.

In implementations, the apparatus 1000 may further include an information sending unit 1010 configured to send the information to be interacted corresponding to the identification information included in the request information to the user account in response to receiving the request information.

Therefore, by suspending and resuming an information interaction operation, the present disclosure waits for a user of an information interaction party to establish an association relationship between human biometric data and a user account in real time, thus reducing the number of times of acquiring the human biometric data, avoiding to perform an the information interaction operation for a number of times, and facilitating an enhancement in the efficiency of information interaction.

It should be further noted that terms such as "comprise", "include" and any other variants thereof are intended to cover a non-exclusive inclusion. A process, method, product or device that includes a series of elements not only includes those elements, but also includes other elements that are not explicitly listed, or further includes elements that already existed in such process, method, product or device. In a condition without further limitations, an element defined by a phrase "include a/an . . . " does not exclude any other similar elements from existing in the process, method, product or device.

The above descriptions are merely exemplary embodiments of the present disclosure, but not intended to limit the present disclosure. Any modifications, equivalent replacements, improvements, and the like, made without departing from the spirit and principles of the present disclosure shall fall in the scope of protection of the present disclosure.

What is claimed is:

1. A method implemented by a device, the method comprising:
    acquiring human biometric data of a second user after an information interaction operation between a first user account of a first user and a second user account of the second user is triggered;
    suspending the information interaction operation without ending the information interaction operation in response to determining that no user account matching the human biometric data is found;
uploading the human biometric data to a server via the device to establish an association relationship between the second user account and the human biometric data; and
resuming the information interaction operation after the second user account is received from the server, and completing the information interaction operation with the second user account.

2. The method of claim 1, further comprising searching for a user account that matches the human biometric data in a local mapping relationship database, wherein the local mapping relationship database stores mapping relationships between pieces of human biometric data and respective user accounts.

3. The method of claim 1, further comprising:
sending the human biometric data to the server to cause the server to search for a user account that matches the human biometric data in an online mapping relationship database; and
receiving a query result from the server, wherein the online mapping relationship database stores mapping relationships between pieces of human biometric data and respective user accounts.

4. The method of claim 1, further comprising receiving identification information from the server after the human biometric data is sent to the server, wherein the human biometric data and the identification information are associatively stored in the server.

5. The method of claim 1, further comprising:
generating identification information; and
sending the identification information to the server to cause associatively storing of the human biometric data and the identification information in the server.

6. The method of claim 5, wherein the identification information comprises at least one of account attribute information of a logged-in account in the device, time information of the human biometric data uploaded by the device, geographical location information of the human biometric data uploaded by the device, attribute information of the device, attribute information of a network environment where the device is located, a custom string, or a random string generated by the device.

7. The method of claim 5, further comprising:
displaying the identification information; or
generating the identification information as a barcode graphic and displaying the barcode graphic.

8. The method of claim 1, wherein the information interaction operation comprises performing a face-to-face transfer operation between the first account of the first user and the second user account of the second user.

9. One or more computer-readable media storing executable instruction that, when executed by one or more processors of a device, cause the one or more processors to perform acts comprising:
sending a data query request to a server via a first user account to query first human biometric data of a first user corresponding to the first user account;
sending an association request to the server to establish a first association relationship between the first user account and the queried first human biometric data;
acquiring second human biometric data of a second user after an information interaction operation between the first user account of the first user and a second user account of the second user is triggered;
suspending the information interaction operation without ending the information interaction operation in response to determining that no user account matching the second human biometric data is found;
uploading the second human biometric data to the server to establish a second association relationship between the second user account and the second human biometric data; and
resuming the information interaction operation in response to receiving interaction information sent by the server based on the second association relationship.

10. The one or more computer-readable media of claim 9, the acts further comprising acquiring and uploading the second human biometric data of the second user from the device.

11. The one or more computer-readable media of claim 9, wherein the data query request comprises identification information, the identification information being generated by the device and sent to the server, or generated by the server and sent to the device.

12. The one or more computer-readable media of claim 11, the acts further comprising sending the second human biometric data and the identification information to cause the server to store the second human biometric data and the identification information associatively therein.

13. The one or more computer-readable media of claim 11, the acts further comprising:
acquiring a barcode graphic displayed on a screen interface of the device; and
analyzing the barcode graphic to obtain the identification information.

14. The one or more computer-readable media of claim 11, wherein the identification information comprises at least one of account attribute information of the first user account in the device, time information of the first human biometric data uploaded by the device, geographical location information of the first human biometric data uploaded by the device, attribute information of the device, attribute information of a network environment where the device is located, a custom string, or a random string generated by the device.

15. The one or more computer-readable media of claim 9, wherein the information interaction operation comprises performing a face-to-face transfer operation between the first user account of the first user and the second user account of the second user.

16. An apparatus, comprising:
one or more processors,
memory, coupled to the one or more processors, the memory storing thereon computer-readable instructions executable by one or more processors, that when executed by the one or more processors, causes the one or more processors to perform acts including:
acquiring human biometric data of a second user after an information interaction operation between a first user account of a first user and a second user account of the second user is triggered;
suspending the information interaction operation without ending the information interaction operation in response to determining that no user account matching the human biometric data is found;
uploading the human biometric data to a server via the device to establish an association relationship between the second user account and the human biometric data; and
resuming the information interaction operation after the second user account is received from the server, and completing the information interaction operation with the second user account.

17. The apparatus of claim 16, the acts further comprising searching for a user account that matches the human biometric data in a local mapping relationship database, wherein the local mapping relationship database stores mapping relationships between pieces of human biometric data and respective user accounts.

18. The apparatus of claim 16, the acts further comprising:
sending the human biometric data to the server to cause the server to search for a user account that matches the human biometric data in an online mapping relationship database; and
receiving a query result from the server, wherein the online mapping relationship database stores mapping relationships between pieces of human biometric data and respective user accounts.

19. The apparatus of claim 16, the acts further comprising receiving identification information from the server after the human biometric data is sent to the server, wherein the human biometric data and the identification information are associatively stored in the server.

20. The apparatus of claim 16, the acts further comprising:
generating identification information; and
sending the identification information to the server to cause associatively storing of the human biometric data and the identification information in the server.

* * * * *